United States Patent [19]
Peck

[11] Patent Number: 4,509,461
[45] Date of Patent: Apr. 9, 1985

[54] ANIMAL TRANSPORT AND GROOMING DEVICE
[76] Inventor: Paul P. Peck, 18918 Hartland St., Reseda, Calif. 91335
[21] Appl. No.: 523,460
[22] Filed: Aug. 15, 1983
[51] Int. Cl.³ .............................................. A61D 3/00
[52] U.S. Cl. .................................................... 119/103
[58] Field of Search .............. 119/19, 103; 280/47.18, 280/47.24, 659, 47.37 R; 108/44, 42, 48, 115, 160; 312/250

[56] References Cited
U.S. PATENT DOCUMENTS

| 639,338 | 12/1899 | Barns | 280/47.18 |
|---|---|---|---|
| 859,696 | 7/1907 | Schmidt | 119/103 |
| 923,656 | 6/1909 | Hunter | 119/103 |
| 1,953,900 | 4/1934 | Wolters | 312/250 |
| 2,726,913 | 12/1955 | Freeman | 312/250 |
| 2,784,004 | 3/1957 | Hamrick, Jr. | 108/48 |
| 3,237,575 | 3/1966 | Larson | 108/160 |
| 4,313,385 | 2/1982 | Fitzgerald | 108/48 |

Primary Examiner—Hugh R. Chamblee
Attorney, Agent, or Firm—Cislo, O'Reilly & Thomas

[57] ABSTRACT

A device for transporting show animals providing a means to transport the caged animal at the show grounds and also providing an area to groom or inspect the animal or animals so transported prior to the showing thereof. A U-shaped support member operatively connected to a chassis member is provided which is capable of being selectively positioned into an erected position away from said chassis member and a folded position on top of said chassis member. A tabletop member is operatively connected to said U-shaped support member and is adapted to be selectively positioned into an open or extended position and a folded position. At least one support leg is pivotally connected at one terminus to said tabletop member to support it when it is in the open or extended position.

13 Claims, 17 Drawing Figures

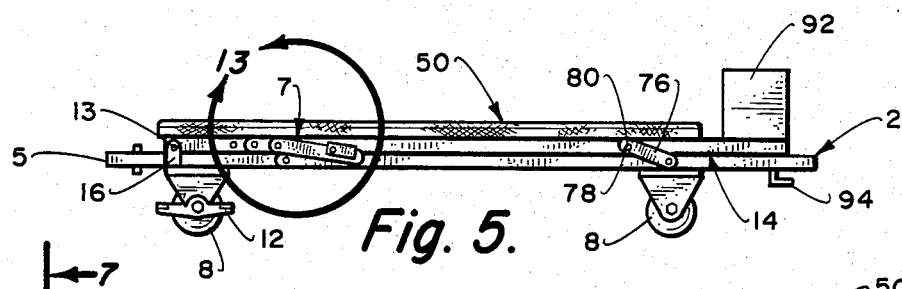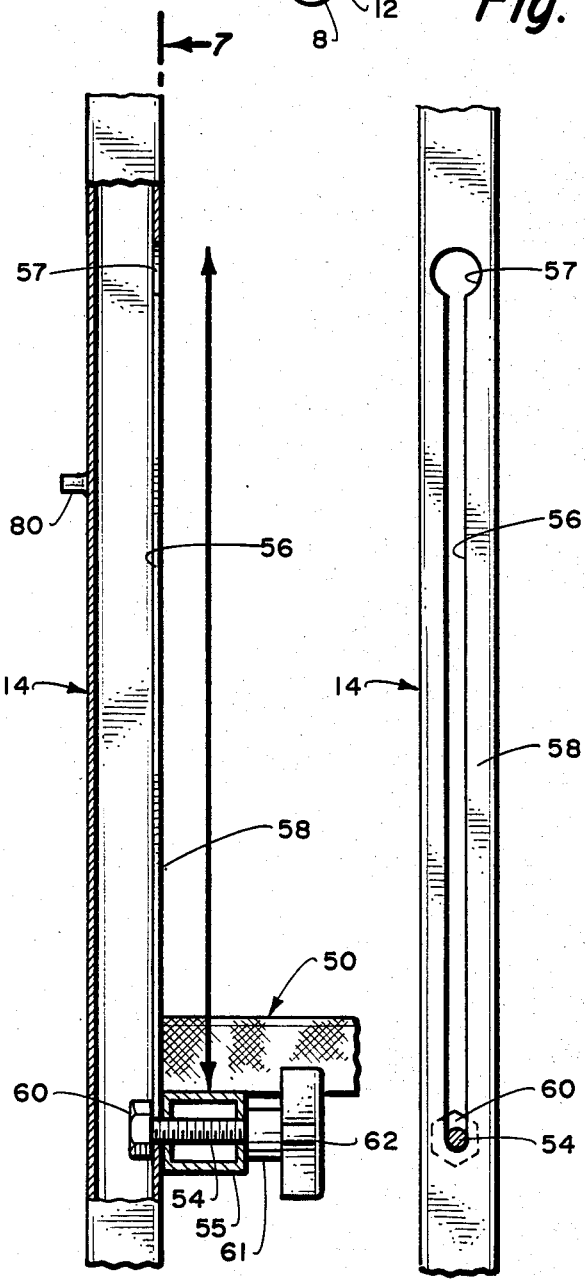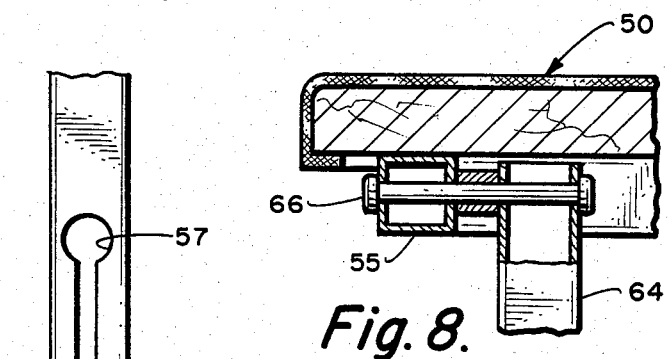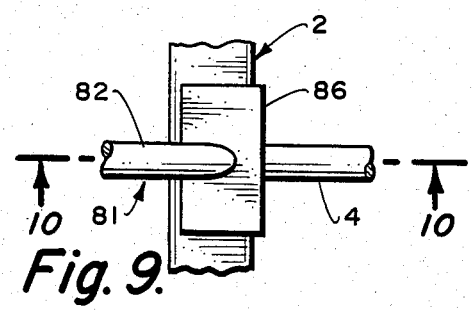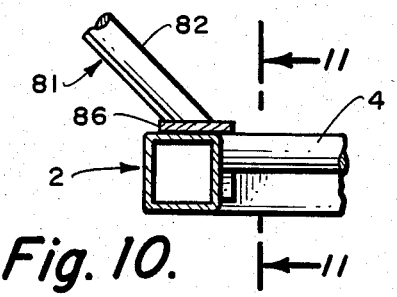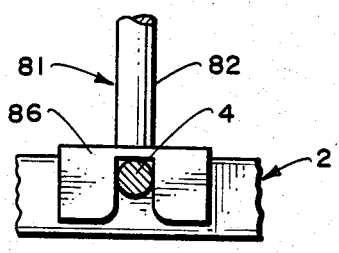

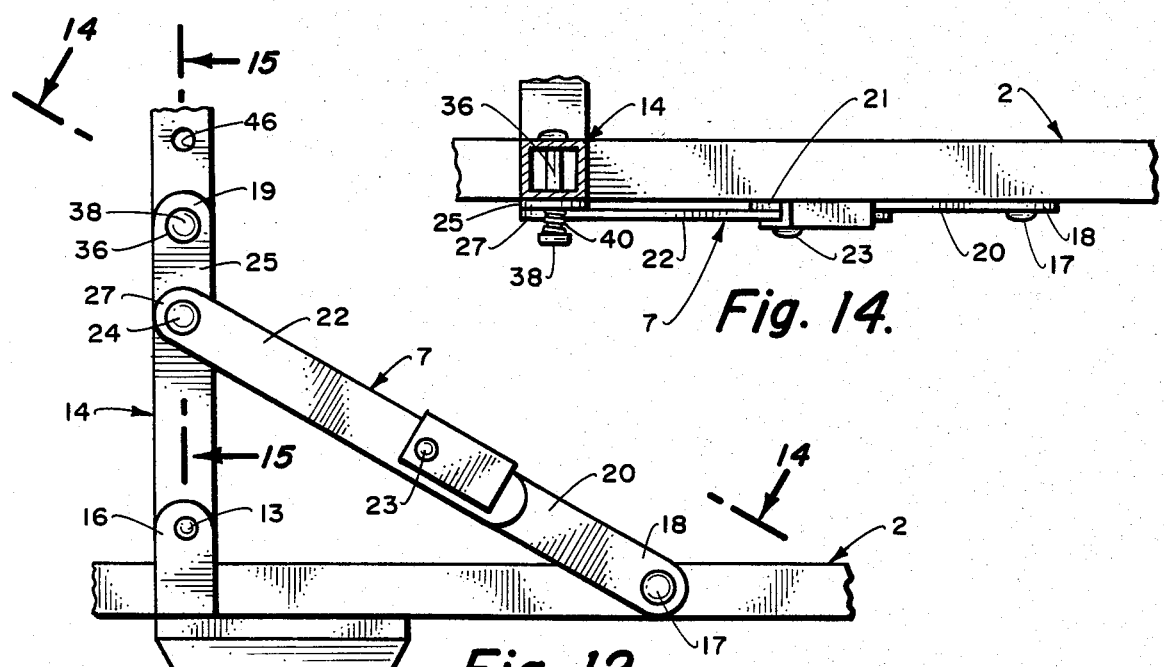
Fig. 14.
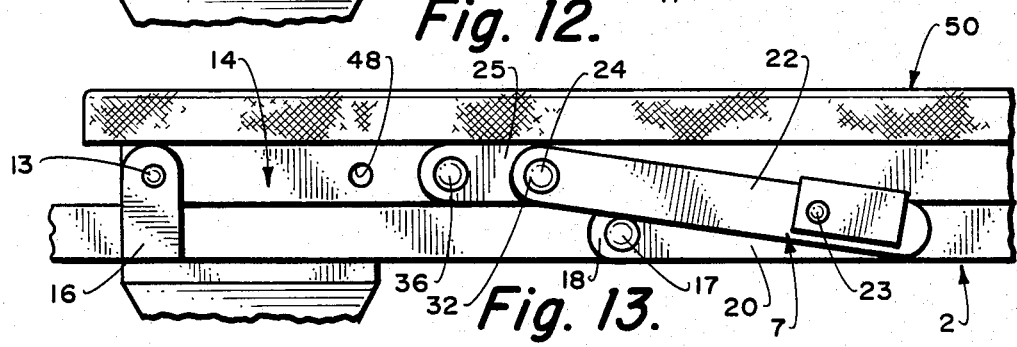
Fig. 12.
Fig. 13.
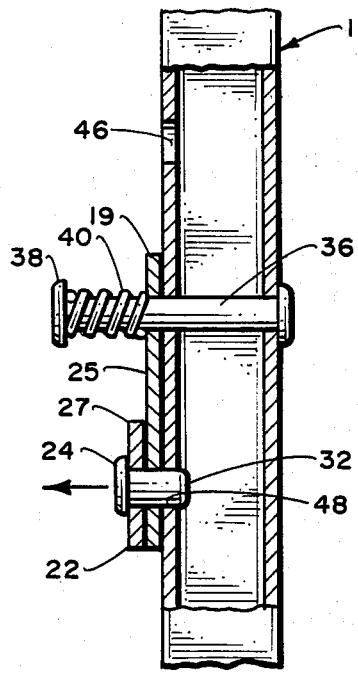
Fig. 15.
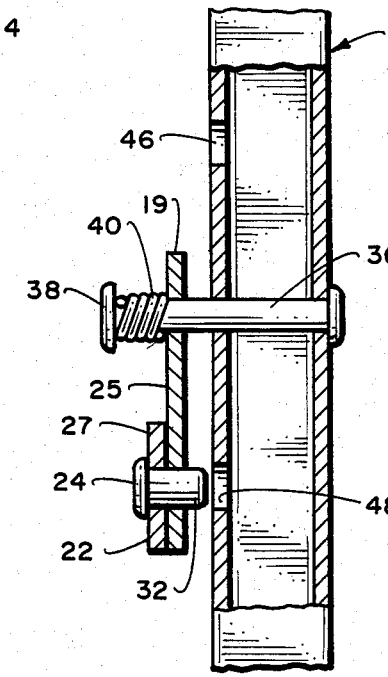
Fig. 16.
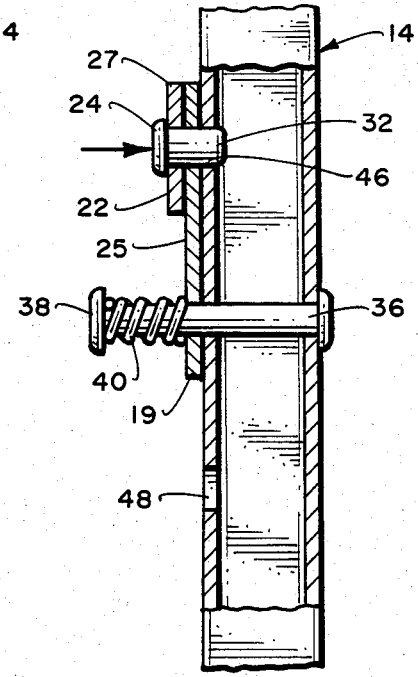
Fig. 17.

ANIMAL TRANSPORT AND GROOMING DEVICE

BACKGROUND OF THE INVENTION

1. Field of the Invention

This invention relates to a transport device for show animals which provides means to transport the caged animal at the showgrounds and also provides an area to groom or inspect the animal or animals so transported prior to the showing thereof. The device is versatile and easily collapsible for ease of asportability to the showgrounds and easily erectible for use thereat.

2. Description of the Prior Art

While the prior art has recognized the need for an animal transport and grooming device, none have disclosed the unique design of the herein disclosed inventive device having the attributes thereof.

SUMMARY AND OBJECTS OF THE INVENTION

It is an object of the invention to provide a transport device for animals which also provides an area to groom or inspect the animal or animals so transported.

It is another object of the invention to provide a transport device for animals which collapses to a compact form for storage or handling when not in use.

It is yet another important object of the invention to provide a transportation device for single or multiple caged animals wherein collapsible cages, not in use, may be conveniently and efficiently stored on the device to provide for ease of movement and security of equipment so asported.

It is another important object of the invention to provide a transportation device for animals having a simple yet sturdy construction so as to allow it to be both economically built and easily repaired and maintained.

In an exemplary embodiment the invention is directed to an animal transport and grooming device comprising the combination of a chassis member having a roller means attached thereto for movement of said chassis. Said chassis is formed by at least two side elements held in a spaced, parallel relationship by at least one transverse element connected at its termini to said side elements. A U-shaped support member is operatively connected at its termini adjacent one side of said chassis member and is capable of being placed into a folded position on top of said chassis member and into an erected position. A brace member is formed by pivotally connected link members operatively connected at one end to said chassis member and at the other end to said U-shaped support member. Said brace member permits erection of the U-shaped member into the erected state and retains said U-shaped support member in a secure manner when it is in its folded position on top of said chassis member. A tabletop member having one end pivotally connected to said U-shaped support member is provided. Said tabletop member has at least one support leg pivotally connected at one end to said tabletop member for support thereof when in the open position.

These and other objects of the invention will become apparent from the hereinafter following commentary taken in conjunction with the drawings.

BRIEF DESCRIPTION OF THE DRAWINGS

FIG. 5 is a side, elevational view similar to FIGS. 3 and 4 showing the device in a folded or collapsed position;

FIG. 6 is a cross-sectional view taken along the line 6—6 of FIG. 3 showing how the tabletop member is adjustably connected to the U-shaped support member;

FIG. 7 is a view taken along the line 7—7 of FIG. 6 showing the slot that permits adjustment of the tabletop member with respect to the U-shaped support member;

FIG. 8 is a cross-sectional view taken along the line 8—8 of FIG. 3 showing how the support leg is pivotally connected to the tabletop member so as to permit it to be folded underneath said tabletop member;

FIG. 9 is a fragmented top plan view along the line 9—9 of FIG. 4 showing a removable handle attached to said chassis member;

FIG. 10 is a cross-sectional view taken along the line 10—10 of FIG. 9;

FIG. 11 is a view taken along the line 11—11 of FIG. 10;

FIG. 12 is an enlarged, side, elevational view taken along the line 12—12 of FIG. 3 showing the brace member in the supporting or erected position;

FIG. 13 is an enlarged side, elevational view taken along the line 13—13 of FIG. 12 showing the brace member in the folded or collapsed position;

FIG. 14 is a cross-sectional view taken along the line 14—14 of FIG. 12 showing the brace member in the supporting or erected position;

FIG. 15 is a cross-sectional view taken along the line 15—15 of FIG. 12 showing the locking pin of the brace member received and retained in the lower aperture as is required for the brace member to properly function in the supporting or erected position;

FIG. 16 is a cross-sectional view taken along the line 15—15 of FIG. 12 showing the locking pin of the brace member withdrawn from the lower aperture in the U-shaped support member; and FIG. 17 is a cross-sectional view taken along the line 15—15 of FIG. 12 showing the locking pin of the brace member received and retained in the upper aperture in the U-shaped support member as is necessary when the U-shaped support member is positioned into the folded position on top of the chassis member.

DESCRIPTION OF THE BEST EMBODIMENTS CONTEMPLATED

Figure 1:
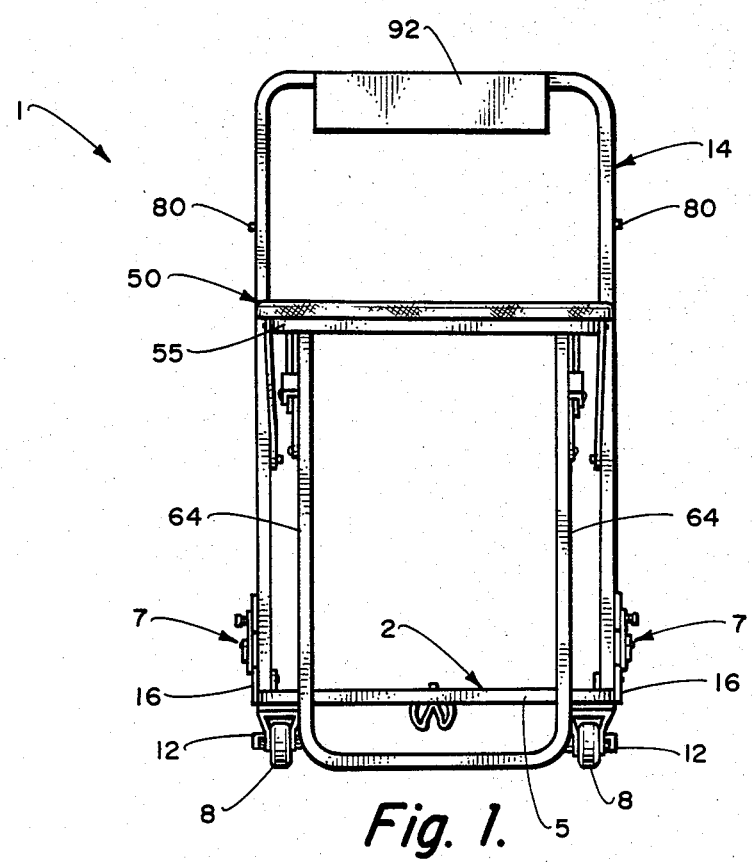
FIG. 1 is a front, elevational view of the animal transport and grooming device of the invention.

Referring to the Figures of drawings wherein like numbers of reference designate like elements throughout, the device 1 comprises a rectangularly shaped chassis member 2 formed by longitudinal members 4 and transverse members 6 connected to form rectangular chassis 2 for reinforcement and rigidity purposes and to provide a base for cages 3 and the like being transported on the device 1.

Roller means shown in the Figures as wheels 8, are attached to the chassis 2 to permit the device 1 to be easily moved once loaded or folded for storage.

It is preferred that at least one pair of wheels 8 be rotatably attached to the chassis 2 to facilitate moving the device.

Figure 3:
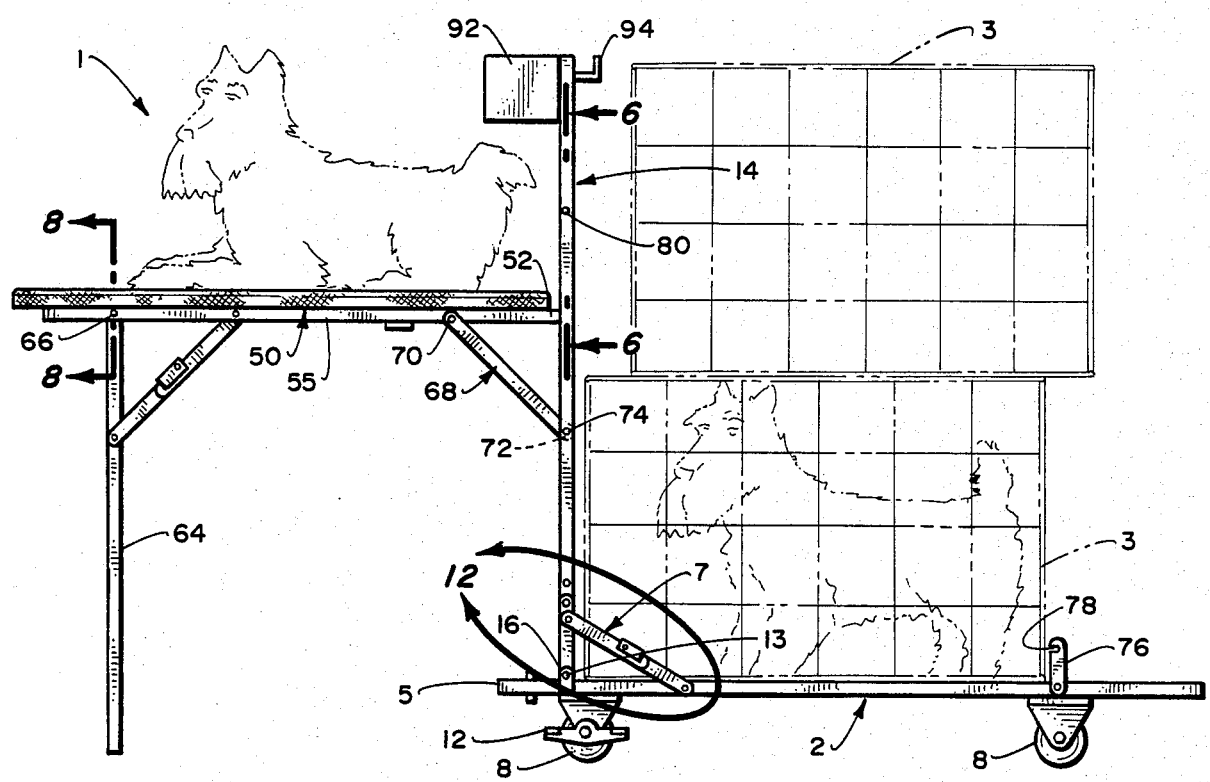
FIG. 3 is a side, elevational view showing the device in the unfolded position and how an animal may be groomed and animal cages transported on the device.
Figure 4:
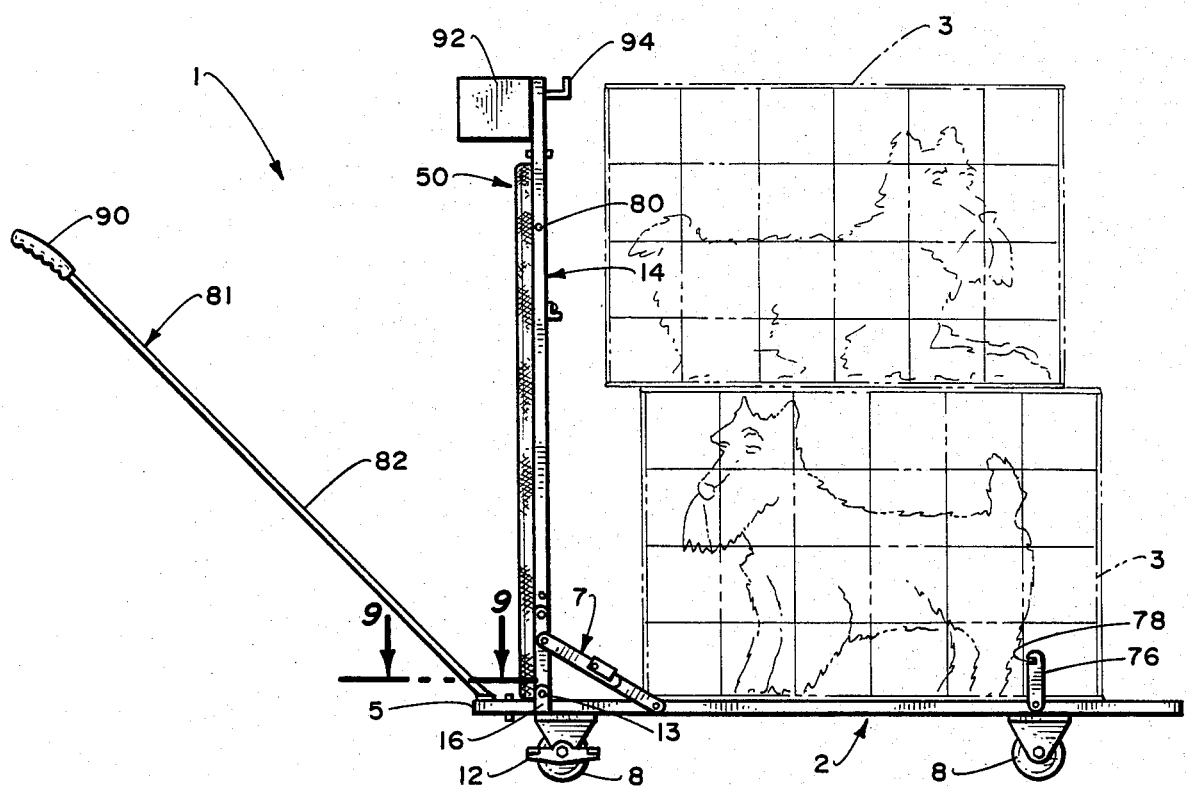
FIG. 4 is a side, elevational view showing the device in the animal transporting state.

Likewise, at least one pair of the wheels 8 should be equipped with a locking means, shown in FIGS. 1, 3 and 4 as lever 12, to prevent movement of the device 1 once it is in desired position, thus, adding to its stability during grooming activities and the like.

A U-shaped support member 14 is operatively connected at its termini 16 adjacent one side 5 of the chassis 2 so as to permit the support member 14 to be selectively placed into a folded position on top of and parallel to the chassis 2 as shown in FIG. 5 for storage and like, and an erected position as shown in FIGS. 1 through 4 for purposes which will become apparent. Support member 14 is shown pivotally connected to the chassis 2 by pivot member 13.

A brace member 7 formed by three link members, is operatively connected at one end 18 to the chassis member 2 by pivot 17 and, at its other end 19, to support member 14 by pivot 36 to permit erection of the support member 14 in a secure manner.

More specifically, link element 20 having its end 18 operatively connected to the chassis member 2 by pivot 17 has its remaining end 21 operatively connected to offset link 22 by pivot 23. The remaining end 27 of the offset link 22 is operatively connected by pivot 24 to the link 25 which is coplanar with the link 20 so that link 22 is similarly offset to the exterior of both links 20 and 25 as is shown in FIGS. 12 through 17 respectively. The remaining end 19 of said link 25 is operatively connected by pivot 36 to said U-shaped support member 14.

Pivot 24 extends inwardly to form a pin 32. Said pin 32 is capable of being selectively positioned into an aperture 46 for securely holding said U-shaped support member 14 in its folded position on top of said chassis member 2, and an aperture 48 in order to support said U-shaped support member 14 in its erected position.

Pivot 36 has an enlarged head section 38. Spring coil 40 surrounds pivot 36 and has one end abutting the enlarged head section 38 and its other end abutting link 25 so as to urge said link 25 to abut support member 14.

Spring coil 40 can be compressed to permit said pin 32 to be withdrawn from either aperture 46 or 48 and repositioned in a selective manner.

Once repositioned, tension in said spring coil 40 will urge said link 25 to once again abut support member 14, this, also urging said pin 32 to be retained in the aperture so selected.

When support member 14 is folded on top of said chassis 2 for storage and the like, said pin 32 will be received and retained in aperture 46 as is shown in FIGS. 13 and 17.

To position said support member 14 into the erected position, said support member 14 is rotated upward from its folded position on top of said chassis 2. Pin 32 is released from aperture 46 by first compressing said spring coil 40 by pulling said link 22 outward as is shown in FIG. 16.

Link 22 is then rotated about pivot 36 to permit said pin 32 to be received and retained in aperture 48, thus permitting said support member 14 to be maintained in an erected position in a secure manner as is shown in FIG. 12.

Once pin 32 is received and retained in aperture 48, said spring coil 40 urges said link 25 to once again abut said support member 14 as is shown in FIG. 15.

FIGS. 15, 16 and 17 provide a visual sequence showing the steps discussed immediately above to withdraw said pin 32 from either aperture 46 or 48 by compressing the spring coil 40 and repositioning the pin 32 to be received and retained in said aperture 46 or 48 chosen by rotation of said links 25 and 22 about pivot 36.

The sequence of FIGS. 15, 16 and 17 represents the brace member 7 being selectively positioned from its supporting, erected position into its folded position.

The sequence of FIGS. 17, 16 and 15 represent the brace member 7 being selectively positioned from its folded position into its supporting, erected position.

A tabletop member 50, shown in FIGS. 1, 3 and 5, is provided for grooming and the like purposes.

Figure 2:
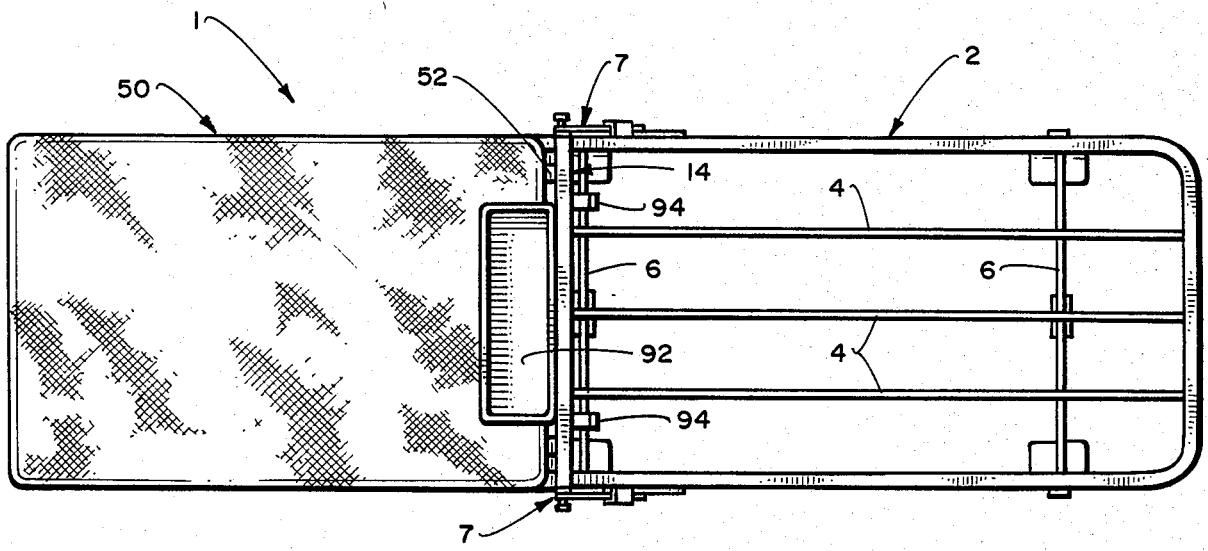
FIG. 2 is a top plan view thereof.

One end 52 of the tabletop 50 is operatively connected to support member 14 so as to permit the tabletop 50 to be selectively placed into an extended position shown in FIGS. 1 through 3 and a folded position in FIGS. 4 and 5.

The preferred embodiment shown in the drawings shows tabletop support member 55 held in position abutting wall 58 of the support member 14 by having an enlarged head section 60 of throughbolt 54 received and retained in a slot 56 formed in said wall 58 of said support member 14.

A threaded end 61 of said throughbolt 54 has a nut 62 threadably mounted thereon, so that by loosening said nut 62, the tabletop member 50 may be slidably adjusted along the length of said slot 56. Once positioned, tightening said nut 62 will cause said tabletop support member 55 to abut the wall 58 of said support member 14, thereby holding said tabletop 50 in position.

A larger opening 57 is made at one end of said slot 56 to enable said bolthead 60 to be removed from said slot 56, thereby enabling said tabletop 50 to be removed from its connected relationship with said supporting member 14 for maintenance, storage or the like.

Said nut 62 may be formed as a knob as shown in FIG. 6 to facilitate tightening and loosening said nut 62 by hand, rather than requiring a tool to tighten or loosen said nut 62.

Said tabletop member 50 has at least one support leg, shown in the preferred embodiment, especially FIG. 1, as a U-shaped support member 64 pivotally connected at its terminal to said tabletop member 50, and capable of being selectively positioned into an extended supporting position and a folded position under said tabletop 50 for storage as is shown in FIG. 5.

FIG. 8 shows the preferred method of pivotally connecting said support leg 64 to said tabletop 50 by using a pivot 66.

A flat bar bracing member 68 is pivotally connected adjacent one end by pivot 70 to said tabletop 50 and has a slot 72 adjacent its remaining end to receive and retain therein a pin 74 on said support member 14 in order to provide increased stability to said tabletop member 50 when it is in its extended position as is shown in FIG. 3.

A latch 76 is pivotally connected adjacent one end of said chassis member 2 and has a slot 78 adjacent its other end to receive and retain therein a pin 80 on said support member 14. Said latch 76 permits said support member 14 to be secured to said chassis member 2 when said support member 14 is in the folded position on top of said chassis member 2.

It is desirable in a preferred embodiment to position the point at which said support member 14 is pivotally connected to said chassis member 2 so that said support member 14 in its folded position on top of said chassis 2 may be secured by sid latch 76 to form an assembly which can be erected to provide a vertical support for side 52 of said tabletop 50 when said tabletop 50 is placed into the extended position. Once erected, side 3 of said chassis 2 will become the base of the assembly in contact with the floor.

The device 1 in the above-described position provides a very stable configuration for grooming and the like with one side of said tabletop member 50 supported by said support leg 64 and the erected assembly formed by said support member 14 and said chassis meber 2 providing support on the other side 52 of said tabletop member 50.

A handle 81 is shown in FIGS. 4 and 9 through 11 having an elongate section 82 with a grasping section on one end 90 and an angled section 86 on the other end to operatively engage and retain therein a portion of said chassis 2 so as to permit the inventive device 1 to be easily maneuvered by handle 81.

The preferred embodiment would also have a grooming tool compartment 92 attached to said support member 14 as shown in FIGS. 1 through 4 to receive and retain therein grooming tools and the like.

Also shown in FIGS. 1 through 4 are hooklike members 94 adapted to receive and hold collapsible cages used to transport an animal or animals on the chassis member 2 of the device 1. Once collapsed, said cages may be hung from said hooks 94 storing them in a compact, efficient and secure manner on said device 1.

The device 1 described in its preferred embodiment above may be used in the following manner. The device is transported in its folded state shown in FIG. 5 to the general area of an animal show in the vehicle of the exhibitor.

Once at the general vicinity of the show, the device 1 is removed from the vehicle and placed on the ground. The device 1 is then set up into its erected position as shown in FIG. 4 to transport an animal or animals in cages or the like carried on the chassis member 2 of said device 1.

The handle 81 is used to facilitate both movement and steering of said device 1 by providing a convenient grasping and steering means.

Once at the selected or authorized location given the exhibitor, said device 1 is placed into the grooming or inspection position as shown in FIGS. 1, 2 and 3, having said tabletop member 50 in the extended or open position and supported by said support leg 64 on one said and said support member 14 on the other side.

The animal to be groomed or inspected may now be placed on said tabletop member 50 as is shown in FIG. 3. The empty cage may now be collapsed and hung on the hook members 94 for storage in a compact and secure manner on said device 1.

Once the exhibition is over, the exhibitor will reverse the above steps and return said animal or animals brought to the show to his vehicle for the return home on said device 1.

While the invention has been described with regard to a specific embodiment, those of ordinary skill in the art will recognize that a simplified mechanism for animal transporting and grooming has now been provided which is simple in its construction and essentially maintenance-free in its operation.

All modifications and changes that will become apparent to those of ordinary skill in the art are intended to be covered by the appended claims.

I claim:

1. A compact, collapsible, easily moved animal transport and grooming device comprising the combination of:
   a chassis member having a roller means attached thereto for movement of said chassis and formed by at least two side elements held in spaced, parallel relationship by at least one transverse element connected at its termini to said side elements;
   a U-shaped support member operatively connected adjacent one end of said chassis member and adapted to being placed into a folded position on top of said chassis member and an erected position away from said chassis member so as to form a support;
   a brace member formed by pivotally connected link members operatively connected at one end to said chassis member and at the other end to said U-shaped support member to permit erection of said U-shaped support member in a secure manner and to hold said U-shaped support member in a secured manner when in its folded position on top of said chassis; and
   a tabletop member having one end pivotally connected to said U-shaped support member and having at least one support leg pivotally connected at one terminus to said tabletop member.

2. The device in accordance with claim 1, wherein said support leg forms a U-configuration and is pivotally connected at its termini to said tabletop member and adapted for selective placement into a folded position underneath said tabletop member and in an unfolded supporting position.

3. The device in accordance with claim 2 which additionally includes a bracing bar pivotally connected at one end to said tabletop member and having adjacent its other end a slot to receive and retain therein a locking pin on said U-shaped support member.

4. The device in accordance with claim 3, which additionally includes a securement bar pivotally connected at one end of said chassis member and having adjacent its other end a slot to receive and retain therein a locking pin on said U-shaped support member.

5. The device in accordance with claim 4, wherein said pivot connecting said tabletop member and said U-shaped support member is operatively received and retained in a slot in said U-shaped support member and has an adjusting means adapted to permit selective adjustment of said tabletop member along said slot.

6. The device in accordance with claim 5, which includes a removable elongate handle to facilitate transportability of said chassis.

7. The device in accordance with claim 5, wherein said roller means are a plurality of wheels attached to the chassis for ease of movement.

8. The device in accordance with claim 7, wherein at least one of said wheels has a locking means to selectively prevent or permit movement of said wheel, thereby adding to the stability of said device.

9. The device in accordance with claim 7, wherein the size of said tabletop member is sufficient in size to support an animal being groomed on said tabletop member.

10. The device in accordance with claim 7, wherein the size of said chassis member is sufficient in size to support at least one cage thereon.

11. The device in accordance with claim 10, which includes at least one hook-shaped member operatively connected to a U-shaped support member to receive and retain thereon said cage.

12. The device in accordance with claim 10, which includes a grooming tool compartment operatively connected to said U-shaped support member to receive and retain therein grooming tools and the like.

13. A compact, collapsible, easily moved animal transport and grooming device comprising the combination of:
   a chassis member sufficient in size to support at least one cage thereon formed by at least two side elements held in spaced, parallel relationship by at least one transverse element connected at its termini to said side elements and having a plurality of wheels attached thereto for ease of movement and, at least one of said wheels, has a locking means to selectively prevent or permit movement of said chassis, and, at least two of said wheels are rotatably attached to said chassis member to facilitate movement and steering of said chassis member;
   a U-shaped support member operatively connected adjacent one end of said chassis member and adapted to being placed into a folded position on top of said chassis member and an erected position away from said chassis member so as to form a support;
   a brace member formed by at least three pivotally connected, link members the end link members being coplanar with the intermediate link member and being offset therefrom, said brace member being operatively connected at one end to said chassis member and at the other end to said U-shaped support member to permit erection of said U-shaped support member in a secure manner and to hold said U-shaped support member in a secured manner when in its folded position on top of said chassis; and
   a tabletop member sufficient in size to support an animal being groomed on said tabletop member, having one end operatively connected to said U-shaped support member by a pivot operatively received and retained in a slot in said U-shaped support member and having an adjusting means adapted to permit selective adjustment of said tabletop member along said slot and having at least one U-shaped support leg connected at its termini to said tabletop member.

* * * * *